United States Patent
Bhatti (10) Patent No.: US 7,191,189 B2
(45) Date of Patent: Mar. 13, 2007

(54) ORGANIZING DATA OBJECTS IN A STORAGE DEVICE

(75) Inventor: Shahzad H. Bhatti, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 461 days.

(21) Appl. No.: 10/718,158

(22) Filed: Nov. 20, 2003

(65) Prior Publication Data

US 2005/0114356 A1 May 26, 2005

(51) Int. Cl.
*G06F 17/30* (2006.01)

(52) U.S. Cl. ..................................... 707/103

(58) Field of Classification Search ............ 707/1, 707/2, 9, 10, 104.1, 103; 709/247, 224
See application file for complete search history.

(56) References Cited

U.S. PATENT DOCUMENTS 5,864,870 A * 1/1999 Guck .................. 707/104.1
6,449,607 B1 9/2002 Tomita et al.
6,496,868 B2 * 12/2002 Krueger et al. ............. 709/247
6,502,108 B1 12/2002 Day, III et al.
2002/0077803 A1 6/2002 Kudoh et al.
2002/0147728 A1 10/2002 Goodman et al.

OTHER PUBLICATIONS

U.S. Appl. No. 10/676,220, "Storage System to Store Data in Hierarchical Data Structures," filed on Oct. 1, 2003, by Shahzad H. Bhatti.

* cited by examiner

*Primary Examiner*—Etienne P. LeRoux (57) ABSTRACT

A method or apparatus of organizing data in a storage device includes receiving data in the storage device, and transforming the received data into a first data object. The first data object is stored in a hierarchical data structure, the hierarchical data structure containing plural levels of data objects.

24 Claims, 6 Drawing Sheets

ORGANIZING DATA OBJECTS IN A STORAGE DEVICE

BACKGROUND

In modern computer systems, storage devices are used to store data and program instructions. Examples of storage devices include integrated circuit (IC) storage devices (such as dynamic or static random access memories, flash memories, and electrically erasable and programmable read-only memories), hard disk drives, floppy disk drives, optical drives, and other types of storage devices.

With advances in technology and manufacturing efficiency, the cost per bit of storage has been reduced dramatically. Storage devices of relatively large capacities (e.g., tens of gigabytes) are widely available to consumers at relatively low prices. As a result, large capacity storage devices can be included in many types of systems, including computers, personal digital assistants (PDAs), cameras, music players, and so forth. The presence of a large capacity storage device in a system means that a large number of files can be stored. For example, if the system is a camera, large numbers of images or video clips can be captured and stored. If the system is a music player, then a large number of song files can be loaded into the player by a user. Computers and PDAs can also store a large number of user files.

As the number of storage files increase, finding a particular file stored in a storage device can become more difficult. A user can manually organize stored files by creating directories to store different types of the files. However, such manual organization by a user is time consuming and often inconsistent since a user may move files to incorrect directories or the user may simply forget to classify newly received files.

DETAILED DESCRIPTION

Figure 1:
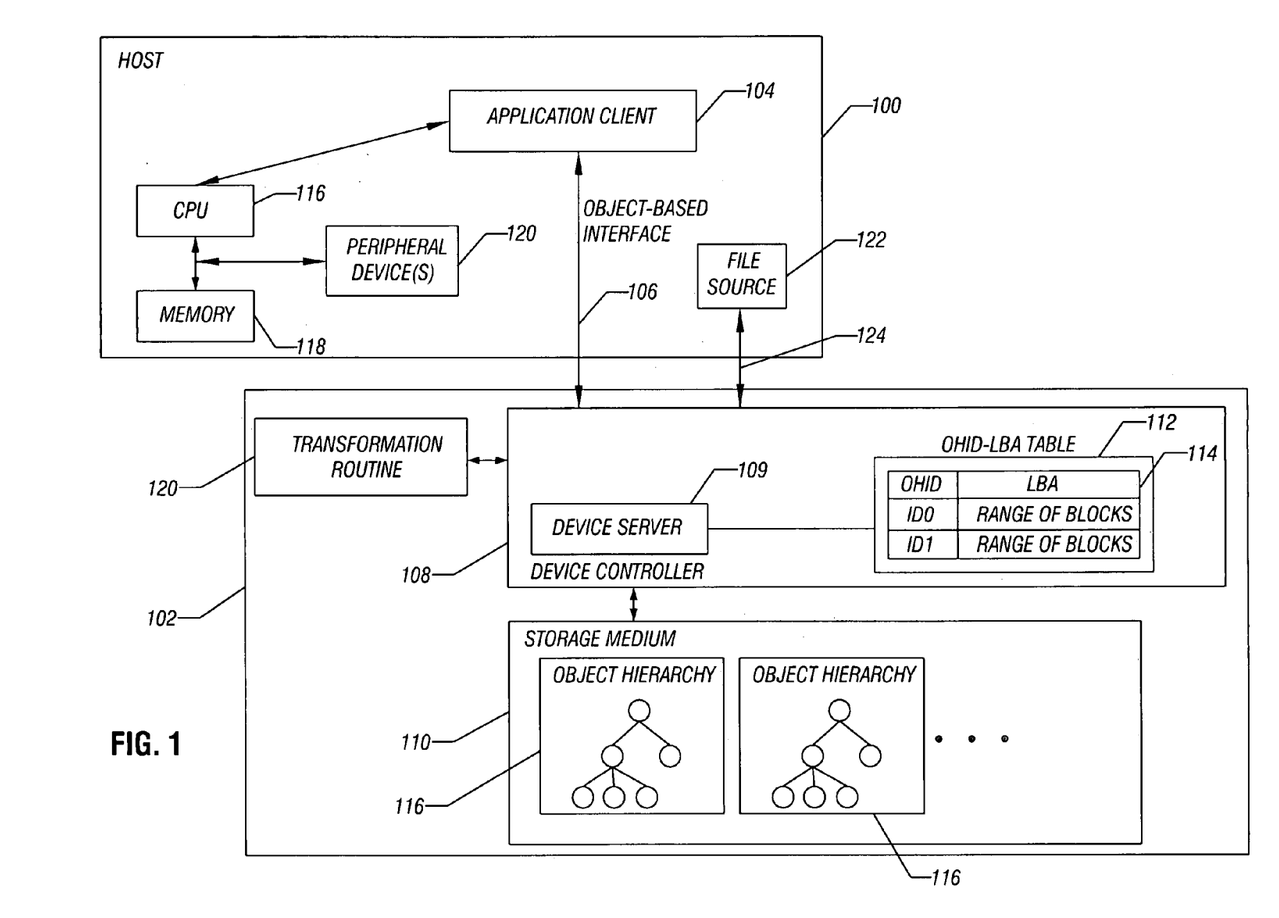
FIG. 1 is a block diagram of an example arrangement of a computing system.

FIG. 1 illustrates an example computing system that includes a host system 100 and a storage system 102. For example, the computing system can be a computer (e.g., desktop computer, notebook computer), a digital camera (still image camera or video camera), music player device, or other type of system. The host system 100 includes an application client 104 (as well as other software modules, not shown) that are executable on a central processing unit (CPU) 116. The CPU 116 is coupled to a memory 118 and peripheral devices 120.

The storage system 102 can be part of the host system 100, or the storage system 102 can be attached or coupled to the host system 100 through a link (e.g., a port, network, and so forth). The application client 104 in the host system 100 accesses the storage system 102 through an object-based interface 106.

The application client 104 sends object-based requests (read requests, write requests, and other requests) over the object-based interface 106 to a device controller 108 in the storage system 102. Each object-based request causes the device controller 108 to perform an access of data objects stored in the storage system 102. The arrangement of FIG. 1 depicts a client-server model, in which requests from the application client 104 are processed by a device server 109 in the device controller 108.

Data is stored in a storage medium 110 of the storage system 102. The storage medium 110 can be a magnetic medium (e.g., hard disk, floppy disk, etc.), an optical medium (e.g., CD or DVD), or a semiconductor storage medium. The storage medium 110 is partitioned into predefined blocks for storing data. The blocks of the storage medium 110 are addressed by physical block addresses, which are mapped to logical block addresses for use by the device controller 108.

Most files generated or received by the host system 100 are too large to be stored within a single block of the storage medium 110. Examples of such files include files containing formatted documents, files containing audio data, files containing image data, files containing video data, files containing multimedia data, and so forth. Large files are fragmented for storing in multiple blocks in the storage medium 110. The fragmented blocks of data on the storage medium 110 do not maintain the characteristic of the original file (formatted document file, image file, video file, audio file, and so forth). Each block of data on the storage medium 110 is just a collection of bits, with the block not containing an indication of whether such bits are part of a formatted document file, video file, audio file, or others.

In accordance with some embodiments of the invention, the storage system 102 is able to recognize the type and characteristic of data stored on the storage medium 110. This recognition is accomplished by the device controller 108 providing an object-level representation of data stored on the storage medium 110.

The object-level representation includes a hierarchical data structure that has multiple levels of data objects. The data objects of each hierarchical data structure (also referred to as an "object hierarchy") are related by some common characteristic (e.g., formatted document data, image data, music data, video data, and so forth). Multiple object hierarchies 116 are stored in the storage medium 110 to represent different groups of data. Each data object of an object hierarchy 116 represents one of a directory, a file, or other data structure. An object hierarchy 116 is stored in a respective set of blocks of the storage medium 110.

Attributes and functions can be associated with each object hierarchy 116 as well as with each data object in the object hierarchy. Attributes include information that describes features associated with a data object in the object hierarchy 116. For example, if a data object contains a music file, the attributes associated with the data object can identify the author of the music file, the date the music file was released, and other information that may be of interest. Functions include any executable software routines or modules that can be invoked to perform specific tasks in response to a data access. For example, if a given data object contains a movie file, then the associated functions may include a routine to play the movie, a routine to rewind the movie, and a routine to fast forward the movie. By associating attributes and functions with each data object, flexibility in the storage, access, and manipulation of data is enhanced.

The structure of the object hierarchies in the storage system 102 provides an inherent ability to organize stored data. For example, a first object hierarchy can be used to store music data, a second object hierarchy can be used to store digital images (such as digital photographs), a third object hierarchy can be used to store video data, and so forth. Within each object hierarchy, further categorization can be performed by adding levels to the object hierarchy. Thus, in the object hierarchy for storing music data, music files can be categorized by the type of music (e.g., blues, jazz, rock), by artist, and/or by album.

By storing data in respective object hierarchies, the device controller 108 is able to automatically organize data in the storage system 102 without manual intervention by a user. Thus, instead of a user having to manually create directories for organizing data and subsequently moving files to such directories, the storage system 102 according to some embodiments automatically classifies and organizes data in object hierarchies.

As further depicted in FIG. 1, the storage system 102 includes a transformation routine 120, executable on the device controller 108, for transforming "regular" files to data objects for storage in object hierarchies. "Regular" files are files in the format of particular software applications (e.g., word processing application, image viewing application, and so forth). The regular files are provided by a file source 122, which can be a storage device (e.g., a floppy disk drive, a CD or DVD drive, memory card, etc.), a network interface card (NIC) to receive files over a network (e.g., local area network, the Internet, etc.), or other source. An interface 124 is provided to communicate files between the file source 122 and the device controller 108.

The transformation routine 120 can be firmware or software executable by a processing core of the device controller 108. The processing core can be in the form of a microcontroller, processor, and so forth. In an alternative embodiment, the transformation routine 120 is located in the host system 100 instead of the storage system 102. However, a benefit of executing the transformation routine 120 on the device controller 108 of the storage system 102 is that resources of the CPU 116 in the host system are not consumed.

By providing the transformation routine 120 in the storage system 102, the transformation routine 120 can take advantage of excess capacity of the device controller 108 to perform the file transformations. During otherwise idle periods of the device controller 108 (periods when the storage system 102 is not in use), the transformation routine 120 is executable on the device controller 108 to perform tasks. For example, if the computing system (including the host system 100 and storage system 102) is a digital camera, then the transformation routine 120 can perform transformations of image or video files to data objects for storage in object hierarchies 116 during periods when the digital camera is not being used to capture images. Similarly, if the computing system is a computer capable of downloading files (e.g., music files, image files, video files, publications, etc.) from a network (such as from websites on the Internet), the transformation routine 120 performs the file transformations during periods that the computer is not being used.

As files are received in the host system 100 by the file source 122, the files are forwarded to the transformation routine 120 in the storage system 102, which transforms the file to data objects suitable for storage in object hierarchies 116. As a result, an effective and reliable file organization mechanism is provided.

To access (read or write) an object hierarchy 116, the application client 104 or transformation routine 120 issues an object-based request to the device server 109. The object-based request specifies a unique object-hierarchy identifier (OHID) that is associated with the object hierarchy 116. The OHID included in the object-based request is not translated by the object-based interface 106 in the host system 100 to block addresses associated with blocks of the storage medium 110. Instead, the translation between the OHID and block addresses is performed by a device server 109 in the device controller 108. The device server 109 can be firmware or software executable on the processing core of the device controller 108.

The device controller 108 also includes a memory 112 that stores an OHID-LBA (logical block address) table 114. The OHID-LBA table 114 is a conversion table to enable translation between an OHID and a range (or other group) of logical block addresses corresponding to the OHID. In the example shown in FIG. 1, the first row of the table 114 includes an OHID having value ID0, which is associated with a range of logical block addresses that identify the blocks containing the object hierarchy identified by ID0. Similarly, the second row of the table 114 contains an OHID of value BD1, which is associated with another range of logical block addresses to represent the storage locations in the storage medium 110 that contain the object hierarchy identified by ID1. In other embodiments, OHIDs are translated to physical block addresses instead of logical block addresses. More generally, OHIDs are translated to some group of one or more addresses to identify blocks of the storage medium 110.

In one implementation, the memory 112, for storing the OHID-LBA table 114 is part of the device controller 108. The memory 112 can be a non-volatile memory (such as flash memory or electrically erasable and programmable read-only memory), dynamic memory (such as dynamic random access random memory, static random access memory, and so forth), or any other type of storage device. Alternatively, the memory 112 can be a predefined region of the storage medium 110 that is separate from the device controller 108.

The object-based interface 106 according to one implementation includes an operating system and a host adapter to enable communication between software modules (e.g., the application client 104) in the host system 100 and the device controller 108 in the storage system 102. Alternatively, the device controller 108 can be part of the host system 100 such that the host adapter can be omitted. By performing the OHID-to-logical block address (and vice versa) translation at the device controller 108, host system resources such as the CPU 116 do not have to be allocated to perform storage access processing. Another benefit offered by storing data in the object hierarchies is that characteristics of data stored in the storage system 102 are maintained. For example, the storage system 102 is aware of the type of data contained in each object hierarchy 116, such as whether the object hierarchy 116 contains music data, video data, formatted document data, or other type of data.

Figure 2:
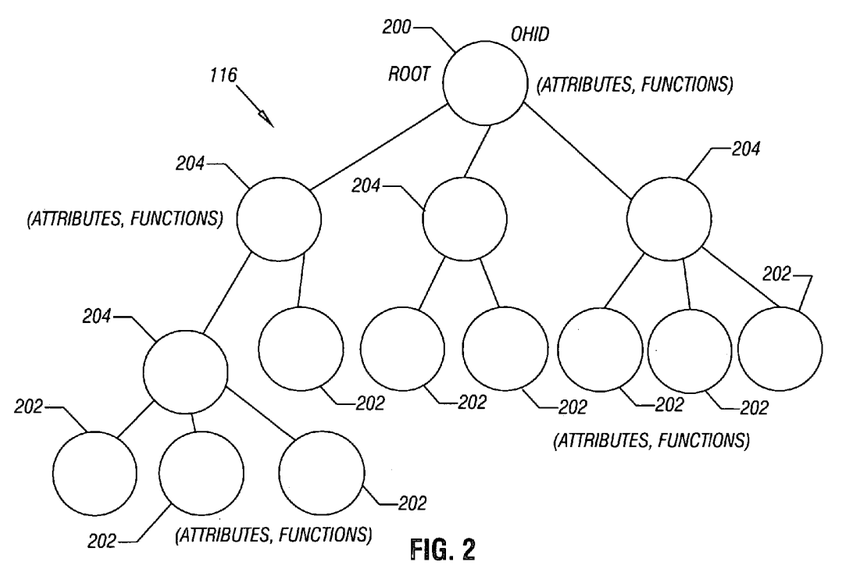
FIGS. 2 and 3 are schematic diagrams of object-based hierarchical data structures, according to some embodiments.

FIG. 2 shows an example object hierarchy 116 that can be stored in the storage 110 of FIG. 1. The object hierarchy 116 includes a root data object 200, which is associated with an OHID. The OHID contained in an access request from the application client 104 refers to the root data object 200 of the object hierarchy 116. The root data object 200 is at the highest level of the object hierarchy 116. The object hierarchy 116 can further include one or plural additional levels of data objects. The object hierarchy in the example shown in FIG. 2 includes three additional levels of data objects. The data objects to which lower level data objects are not attached are referred to as leaf data objects 202. Leaf data objects 202 are coupled by intermediate data object 204 to the root data object 200. As shown in the example of FIG. 2, attributes and functions are also associated with at least some of the data objects 200, 202, and 204

Effectively, the object hierarchy 116 is an interconnected tree of nodes, with each node representing a data object. The different portions or branches of the tree of nodes can be used to represent different categories of data.

Figure 3:
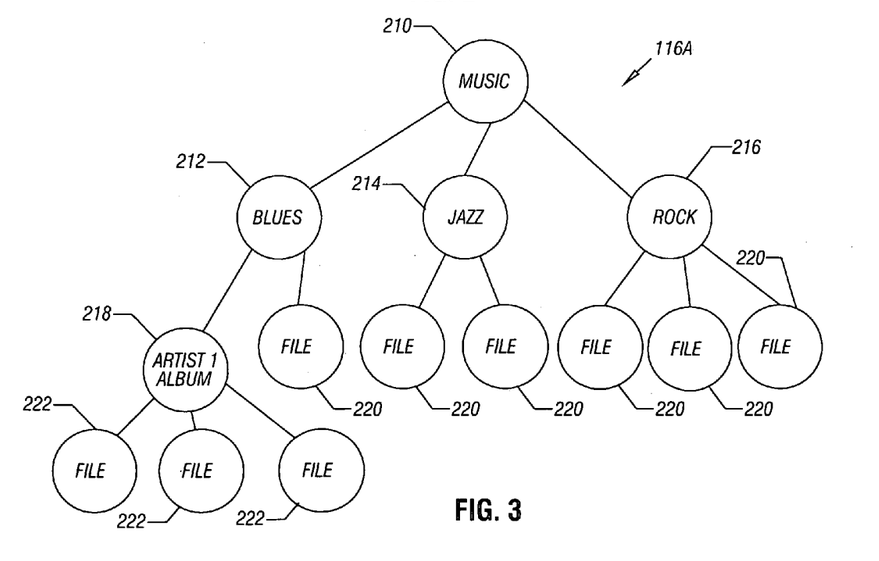

FIG. 3 shows a more specific example of an object hierarchy 116A, which contains a root data object 210 that indicates that the data stored in the object hierarchy 116A is music data. The object hierarchy 116A includes the following intermediate data objects: data object 212 to indicate storage of blues music, data object 214 to indicate storage of jazz music, and data object 216 to indicate storage of a rock music. The intermediate data objects 212, 214, and 216 are analogous to directories. The leaf data objects 220 in the object hierarchy 116A contain the actual music files associated with each category of music (blues, jazz, and rock). In addition, another intermediate data object 218 is present in the object hierarchy 116A. The data object 218 is connected below the blues data object 212. The data object 218 represents an album that is associated with a particular artist. Coupled to the album data object 218 are leaf data objects 222 containing the music files of that particular album.

Figure 4:
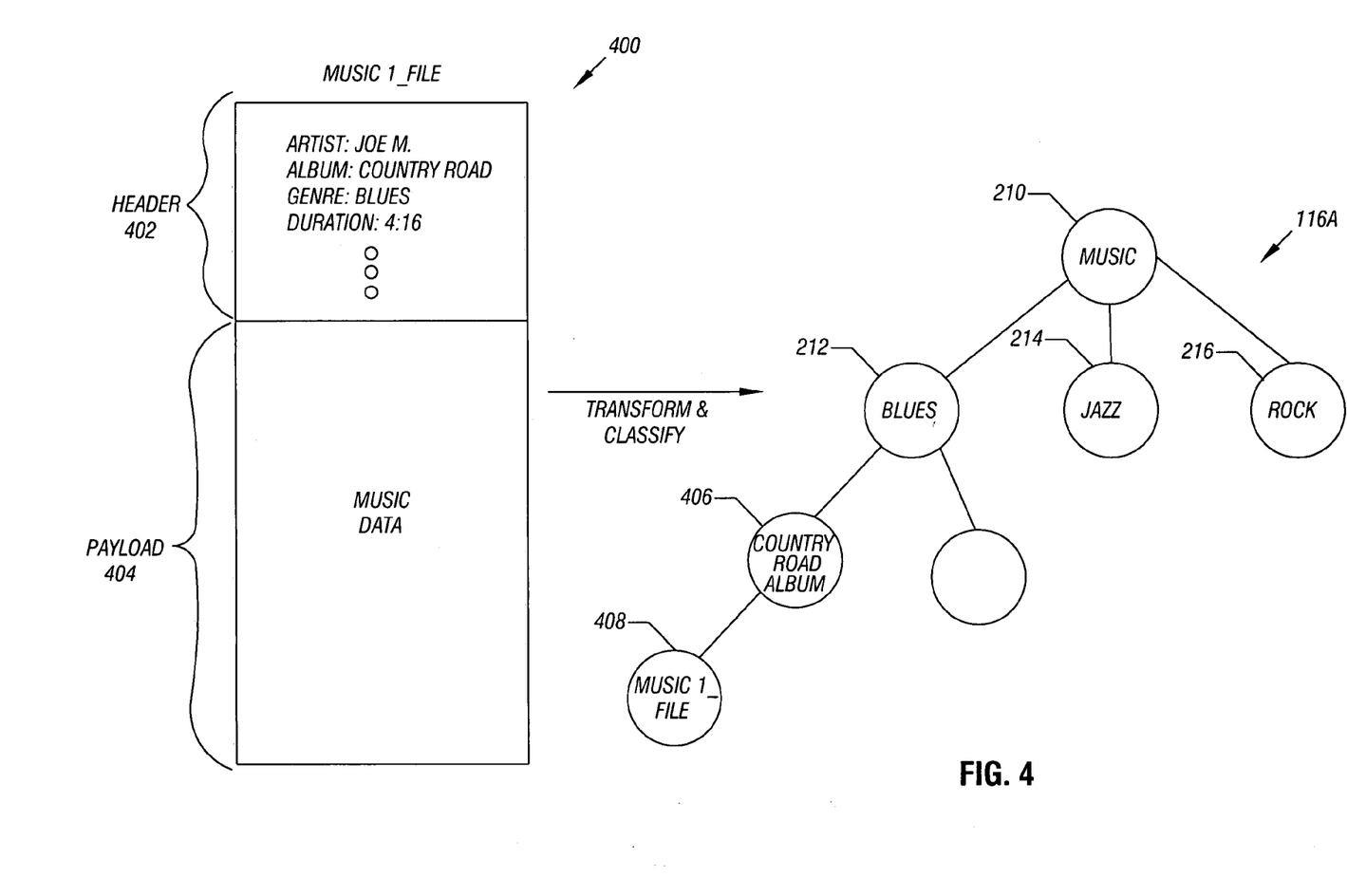
FIGS. 4 and 5 illustrate transformation of conventional files into data objects for storage in respective object-based hierarchical data structures, in accordance with two example implementations.

FIG. 4 illustrates the transformation of a music file ("MUSIC1_FILE") 400 into a data object 408 for storage in the object hierarchy 116A. The music file 400 has a header portion 402 and payload portion 404. The header portion 402 contains various information regarding the music file 400, such as the artist (Joe M. in the example), album (titled "Country Road" in the example), genre (e.g., blues), and duration. The payload portion 404 contains the music data. The information contained in the header portion 402 is referred to as metadata, which is information describing other information (in this case the data contained in the payload portion 404).

The music file 400 is transformed by the transformation routine 120 (FIG. 1) into the data object 408. Once the data object 408 is created, the transformation routine 120 issues an object-based access request to store the data object 408 as a leaf object in the object hierarchy 116A. The data object 408 is connected below an intermediate object 406 labeled "Country Road," which is an album by the artist Joe M. Thus, the data objects connected to the intermediate object 406 at a level below the intermediate object 406 contain songs of the album "Country Road."

The location at which the data object 408 is stored in the object hierarchy 116A is based on the metadata contained in the header portion 402 of the music file 400. The metadata in this example identifies the genre of the music (blues) and the album ("Country Road"). Thus, the data object 408 is stored as a node connected one level below the node corresponding to the intermediate data object 406.

Figure 5:
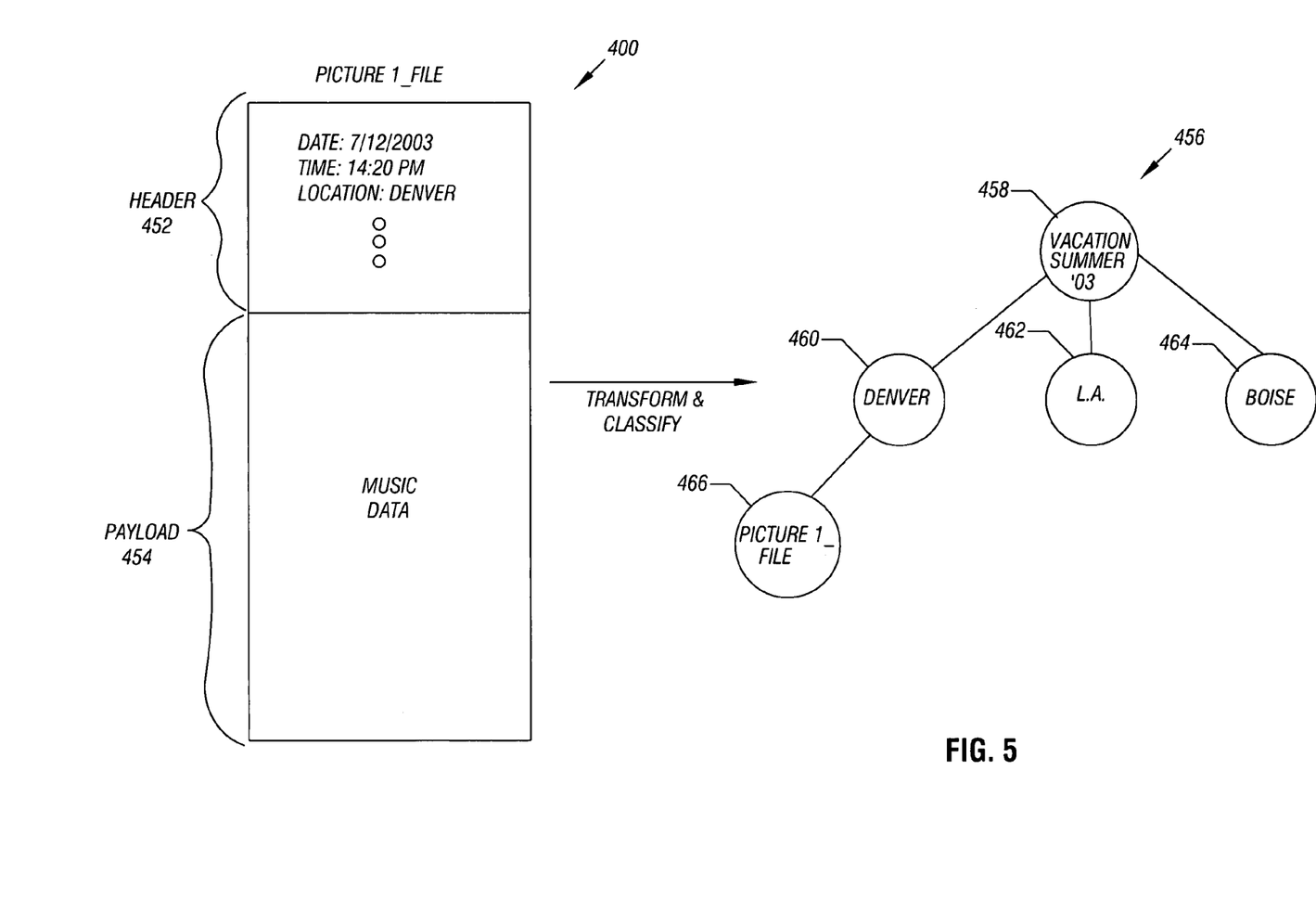

In another example, as shown in FIG. 5, a picture file 450 includes a header portion 452 and payload portion 454. The header portion 452 contains the following metadata: data and time the picture was taken, location of the picture, and so forth. The payload portion 404 contains the image data.

The picture file 450 is transformed by the transformation routine 120 into a data object 466 and stored in an object hierarchy 456. The object hierarchy 456 has a root object 458 that indicates that the object hierarchy 456 contains data relating to the summer vacation of 2003. Below the root object 458 are intermediate data objects 460, 462, and 464 that represent different locations, such as Denver, Salt Lake City, and Boise. The data object 466, which contains the image data of the picture file 450, is stored under the intermediate object 460 based on the metadata in the header portion 452 of the picture file 450.

Figure 6:
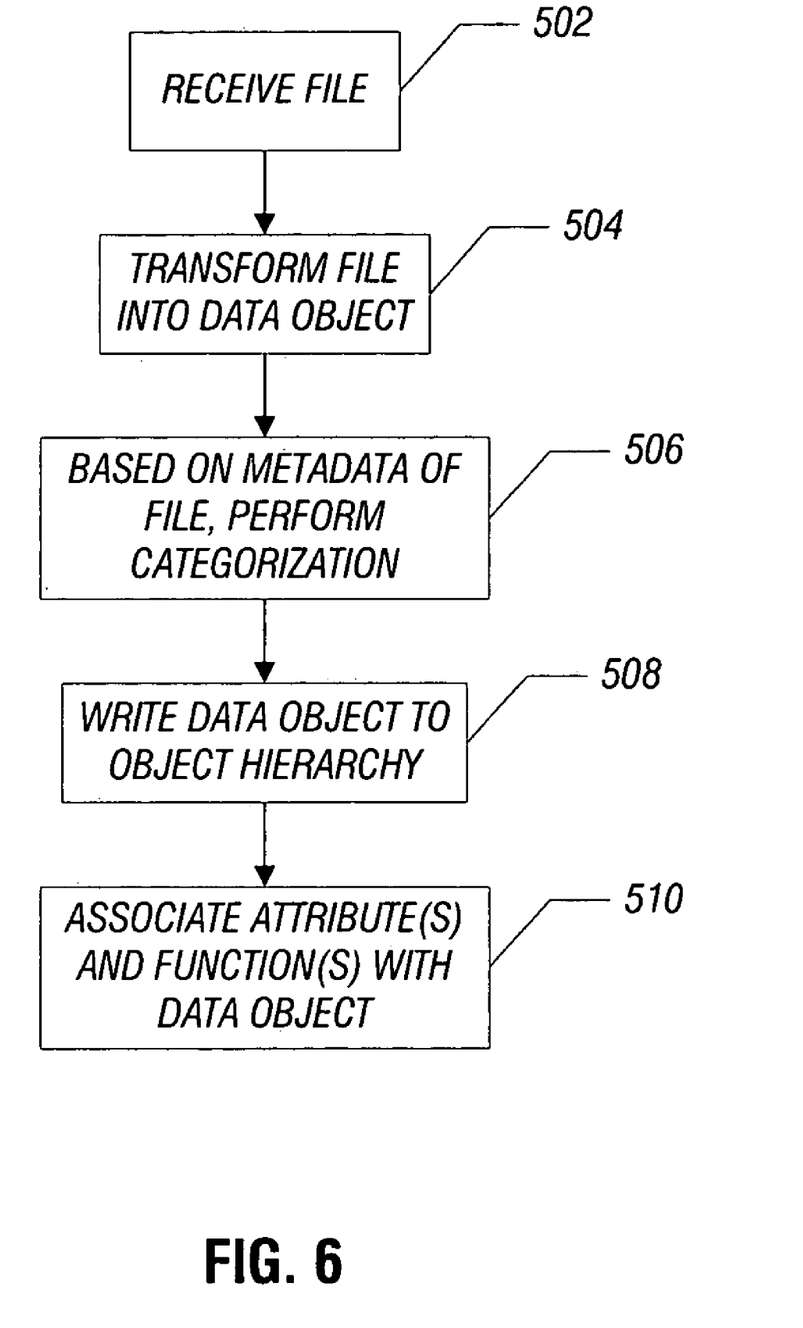
FIG. 6 is a flow diagram of a process of organizing data, in accordance with an embodiment.

FIG. 6 is a flow diagram of a process of organizing files, according to one embodiment. In response to receiving (at 502) a file from the file source 122 (FIG. 1), the transformation routine 124 (FIG. 1) transforms (at 504) the file into a data object. Based on the metadata associated with the file being transformed, the transformation routine 120 performs (506) a categorization of the data object (to determine which object hierarchy the newly created data object is to be stored in and where in the object hierarchy the newly created data object is to be stored at).

The data object is then written (at 508) by the transformation routine 120 to the object hierarchy by issuing a write request (illustrated in FIG. 7) to the device server 109. Optionally, the transformation routine 120 (or the device server 109) associates (at 510) attribute(s) and function(s) with the stored data object. For example, the attribute(s) may include the metadata associated with the transformed file. Examples of functions that may be associated with the data object include functions to provide security (a function to prompt for a password on a subsequent access of the data-object), functions to display or otherwise present the data object (e.g., image or video display function, audio play function, etc.), and so forth.

Figure 7:
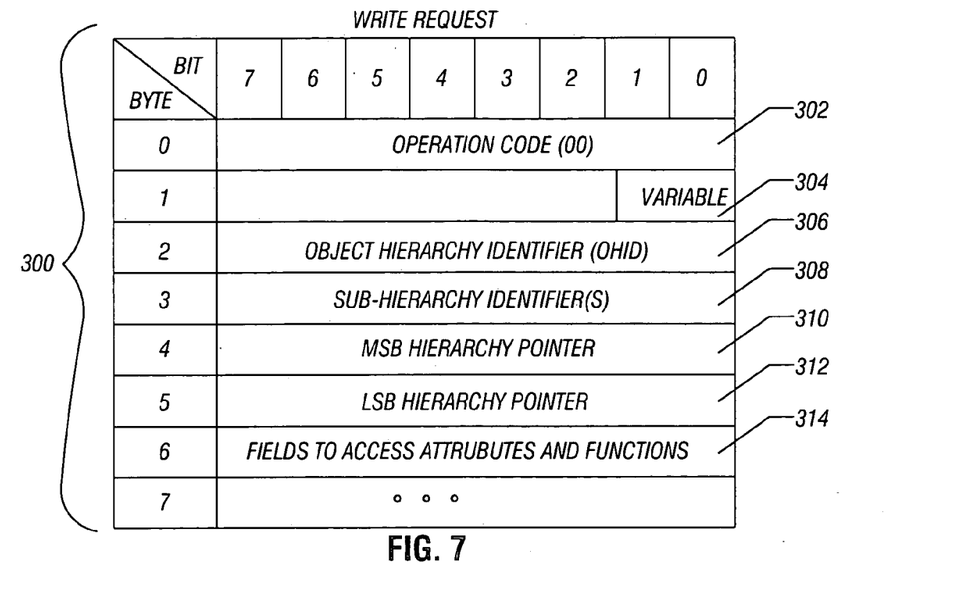
FIGS. 7 and 8 illustrate write and read commands, respectively, according to some embodiments of the invention for accessing (writing or reading) object-based hierarchical data structures.
Figure 8:
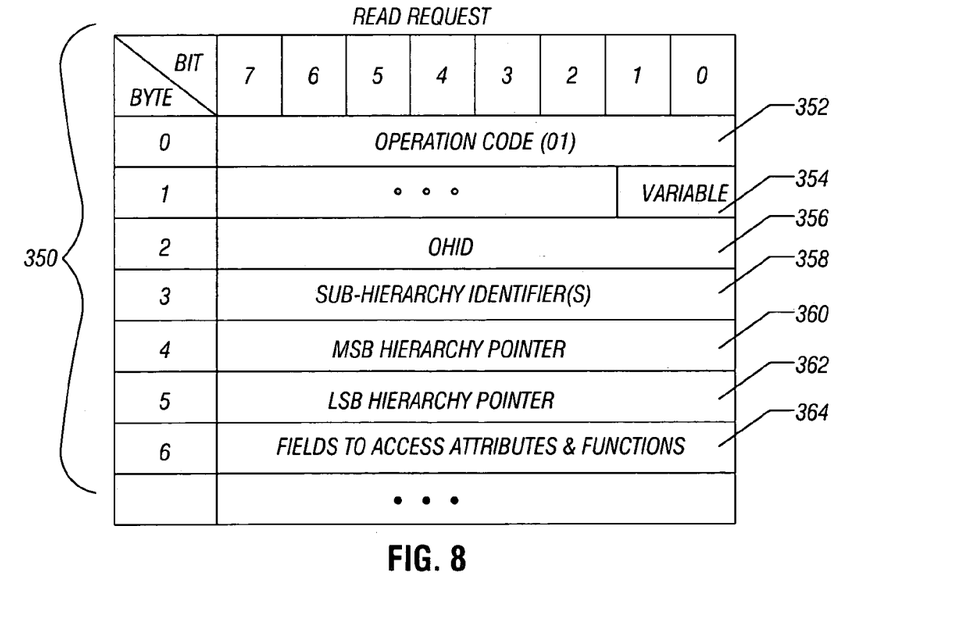

FIGS. 7 and 8 illustrate example formats of an object-based write request 300 and an object-based read request 350, respectively, that are used for accessing object hierarchies stored in the storage system 102. The specific formats of the write and read requests are provided as examples. In other implementations, the write and read requests have other formats.

The write request 300 includes multiple bytes of information, including an operation code (having hexadecimal value 00 or some other predetermined value to indicate a write). A variable indicator 304 indicates that the length of the write request is variable. An OHID field 306 contains the object hierarchy identifier of the object hierarchy that is to be accessed by the write request to perform the write. A sub-hierarchy identifier (SOHID) 308 more specifically identifies a data object in the object hierarchy 116. The SOHID 308 identifies one of the data objects in the object hierarchy 116. More than one SOHID can be specified in the write request.

In one embodiment, the object hierarchy 116 has a fixed hierarchy, where the depth (number of levels) and breadth (number of data objects at each level) are fixed. With a fixed hierarchy, a matrix can be used to identify selected data object in the hierarchy. Each location in the matrix (which is the SOHID) corresponds to a specific data object. Selection of a data object is performed by setting the value of the matrix location to a given value (such as a binary "1" value).

In another implementation, the object hierarchy 116 is a dynamic hierarchy, where the depth and breadth are not predefined but rather can vary. With the dynamic hierarchy, a linked list of SOHIDs is used to identify corresponding data objects. In response to receiving a write request containing an OHID and an SOHID, the device server 109 (FIG.

1) traverses the linked list corresponding to the OHID to find the specified SOHID and the data object corresponding to the SOHID.

The write request 300 also includes a most significant byte (MSB) hierarchy pointer 210 and a least significant byte (LSB) hierarchy pointer 312. The hierarchy pointers are effectively offsets to point to the particular portion within a data object to which the write is to be performed. The write request 300 also includes fields to access attributes and function associated with the data objects. The remaining fields of the write request 300 include the data to be written to the portion pointed to by the MSB hierarchy pointer 310 and the LSB hierarchy pointer 312.

The read request 350 shown in FIG. 8 includes an operation code 352, which in this case has the hexadecimal value 01, or some other predefined value, to indicate a read. A variable indicator 354 indicates that the read command structure 350 has a variable length, and an OHID field 356 indicates the object hierarchy targeted by the read request.

The read request 350 also includes a field 388 containing one or plural sub-hierarchy identifier(s) to identify the data object(s) to read from in the target object hierarchy. The MSB and LSB pointers in fields 360 and 362 specify the pointer(s) of portions of the selected data object(s) that is to be retrieved. Optionally, an entire data object may be retrieved (instead of just a portion of the data object), in which case the MSB and LSB hierarchy pointer can be omitted. The read request also includes fields 364 to enable access of attributes and functions associated with the data objects of an object hierarchy.

In addition to the write request and read request referred to above, other requests can also be issued by the application client 104 (FIG. 1). One such other request is an inquiry request that is submitted to the device server 109 to retrieve predetermined information associated with each object hierarchy. For example, the inquiry request can cause retrieval of the sub-hierarchy identifier information, such as the matrix and linked list referred to above.

As noted above, various software modules, such as the transformation routine 120 and the device server 109 (FIG. 1) are implemented in firmware or software, or the combination of firmware and software. The software or firmware is executed on a control unit or processor in the storage system 102 or host system 100 (FIG. 1). The control unit or processor includes a microprocessor, microcontroller, processor module or subsystem (including one or more microprocessors or microcontrollers), or other control or computing devices. As used here, a "controller" refers to hardware, firmware, software, or a combination thereof. A "controller" can refer to a single component or to plural components (whether software, firmware, or hardware).

Data and instructions (of the software or firmware) are stored on one or more machine-readable storage media. The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash-memories; magnetic disks such as fixed, floppy and removable disks; other magnetic media including tape; and optical media such as compact disks (CDs) or digital video disks (DVDs).

In the foregoing description, numerous details are set forth to provide an understanding of the present invention. However, it will be understood by those skilled in the art that the present invention may be practiced without these details. While the invention has been disclosed with respect to a limited number of embodiments, those skilled in the art will appreciate numerous modifications and variations therefrom. It is intended that the appended claims cover such modifications and variations as fall within the true spirit and scope of the invention.

What is claimed is:

1. A method of organizing data in a storage device, comprising:
    receiving data in the storage device;
    transforming the received data into plural data objects;
    storing the plural data objects in corresponding plural hierarchical data structures, each of the hierarchical data structures containing plural levels of data objects; and
    receiving an access request containing an identifier of one of the hierarchical data structures.

2. The method of claim 1, wherein the received data is associated with information describing the received data, and each hierarchical data structure contains plural levels of interconnected nodes, each node representing a respective data object, wherein storing a particular one of the data objects in the corresponding hierarchical data structure comprises storing the particular data object as one of the nodes of the corresponding hierarchical data structure based on the information describing the received data.

3. The method of claim 2, wherein receiving the data comprises receiving files each having a header portion containing the information describing the received data.

4. The method of claim 1, wherein the received data is associated with information describing the received data, and
    wherein different portions of each hierarchical data structure represent different categories of data, and wherein storing a particular one of the data objects in the corresponding hierarchical data structure comprises storing the particular data object in one of the different portions of the corresponding hierarchical data structure based on the information describing the received data.

5. The method of claim 1, wherein the plural hierarchical data structures are distinct hierarchical data structures to store respective different groups of data, wherein storing data objects in respective ones of the distinct hierarchical data structures is based on respective types of data contained in the data objects.

6. The method of claim 1, wherein receiving the data comprises receiving plural files, wherein transforming the received data into plural data objects comprises transforming the files into plural respective data objects.

7. The method of claim 6, wherein each of the files contains metadata to describe data contained in the respective one of the files,
    wherein storing each of the data objects in a respective one of the hierarchical data structures is based on the metadata associated with a respective one of the files.

8. The method of claim 1, further comprising:
    in response to the access request containing the identifier, accessing the one of the hierarchical data structures to perform an access specified by the access request.

9. The method of claim 1, wherein receiving the access request comprises receiving one of a read request containing the identifier and a write request containing the identifier.

10. The method of claim 1, wherein receiving the access request comprises receiving the access request containing a field to access a software routine for manipulating a data object that is to be accessed in response to the access request.

11. An article comprising at least one storage medium containing instructions that when executed cause a storage controller of a storage device to:
- receive files for storage in the storage device, wherein the received files are each associated with metadata;
- transform the received files into respective data objects; and
- store the data objects in respective plural hierarchical data structures, each hierarchical data structure having plural portions for storing plural respective categories of data objects,
- wherein a particular one of the data objects is stored in one of the plural portions of the corresponding hierarchical data structure based on the metadata; and
- receive an access request containing an identifier that identifies one of the hierarchical data structures.

12. The article of claim 11, wherein each hierarchical data structure has plural interconnected nodes, each node representing a corresponding data object,
- wherein storing the particular data object comprises storing the particular data object as one of the nodes in the corresponding hierarchical data structure based on the metadata.

13. The article of claim 12, wherein receiving the files comprises receiving files each having a header portion containing the metadata.

14. The article of claim 11, wherein a first one of the files is associated with metadata indicating a category of data in the first file, and a second one of the files is associated with metadata indicating a category of data in the second file,
- wherein storing the data objects in respective hierarchical data structures is based on the respective metadata.

15. The article of claim 11, wherein the instructions when executed cause the storage controller to further access the one of the hierarchical data structures in response to the access request to access a data object in the one of the hierarchical data structures.

16. The article of claim 11, wherein the access request further contains a field to access a software routine for manipulating a data object to be accessed in response to the access request.

17. The article of claim 16, wherein the instructions when executed cause the system to apply the software routine to the data object to be accessed by the access request.

18. A system comprising:
- a storage to store hierarchical data structures, each hierarchical data structure containing plural levels of data objects;
- a module to receive data; and
- a controller to transform the received data into plural data objects, and to store the plural data objects in corresponding hierarchical data structures; and
- the controller to receive plural access requests containing identifiers of different ones of the hierarchical data structures.

19. The system of claim 18, wherein the controller is to store the data objects in corresponding hierarchical data structures based on metadata associated with the received data.

20. The system of claim 19, wherein the received data comprises plural files, and the controller is to transform the plural files to corresponding data objects, each of the files associated with respective metadata,
- the controller to further store a first one of the data objects in a first one of the hierarchical data structures based on the respective metadata indicating that the first file contains data belonging to a first category, and
- the controller to further store a second one of the data objects in a second one of the hierarchical data structures based on the respective metadata indicating that the second file contains data belonging to a second category.

21. The system of claim 18, wherein the received data is associated with information describing the received data, and each hierarchical data structure includes plural portions to store different categories of data,
- the controller to store a particular one of the data objects in one of the plural portions of the corresponding hierarchical data structure based on the information associated with the received data that indicates a category of the received data.

22. The system of claim 18, wherein the received data is associated with information to indicate a category of the received data, and the hierarchical data structure comprises a tree of interconnected nodes,
- the controller to store a corresponding data object in the hierarchical data structure as a node in the tree of interconnected nodes based on the information indicating the category of the received data.

23. The system of claim 18, wherein the controller is to further access different data objects in different hierarchical data structures in response to the identifiers of the access requests.

24. The system of claim 18, wherein each access request further contains a field to invoke a respective software routine for manipulating a respective data object to be accessed in response to the access request.

* * * * *

UNITED STATES PATENT AND TRADEMARK OFFICE
CERTIFICATE OF CORRECTION

PATENT NO. : 7,191,189 B2  Page 1 of 1
APPLICATION NO. : 10/718158
DATED : March 13, 2007
INVENTOR(S) : Shahzad H. Bhatti It is certified that error appears in the above-identified patent and that said Letters Patent is hereby corrected as shown below:

On the Title page, in Item (73), in "Assignee", in column 1, line 2, after "Company," delete "LP.," and insert -- L.P., --, therefor.

In column 4, line 23, delete "IDO" and insert -- ID0 --, therefor.

In column 4, line 27, delete "BD1" and insert -- ID1 --, therefor.

Signed and Sealed this

Tenth Day of March, 2009

JOHN DOLL
*Acting Director of the United States Patent and Trademark Office*